United States Patent
Panda

(10) Patent No.: US 9,449,095 B1
(45) Date of Patent: Sep. 20, 2016

(54) REVISING SEARCH QUERIES

(71) Applicant: Google Inc., Mountain View, CA (US)

(72) Inventor: Navneet Panda, Mountain View, CA (US)

(73) Assignee: Google Inc., Mountain View, CA (US)

( * ) Notice: Subject to any disclaimer, the term of this patent is extended or adjusted under 35 U.S.C. 154(b) by 292 days.

(21) Appl. No.: 13/731,959

(22) Filed: Dec. 31, 2012

(51) Int. Cl.
*G06F 17/30* (2006.01)

(52) U.S. Cl.
CPC .............................. *G06F 17/30864* (2013.01)

(58) Field of Classification Search
CPC ................................ G06F 17/30; G06F 17/00
See application file for complete search history.

(56) References Cited

U.S. PATENT DOCUMENTS

| | | | |
|---|---|---|---|
| 6,519,592 B1 * | 2/2003 | Getchius | G06F 17/3048 |
| 6,785,671 B1 * | 8/2004 | Bailey | G06F 17/30864 705/26.81 |
| 7,689,585 B2 * | 3/2010 | Zeng | G06F 17/30864 707/999.104 |
| 7,756,855 B2 * | 7/2010 | Ismalon | G06F 17/3064 707/713 |
| 8,156,109 B2 * | 4/2012 | Kamvar | G06F 17/30646 707/713 |
| 8,280,900 B2 * | 10/2012 | Pickens | G06F 17/30672 707/765 |
| 8,442,970 B2 | 5/2013 | Ollis et al. | |
| 8,442,973 B2 * | 5/2013 | Cramer | G06F 17/30867 707/723 |
| 8,473,489 B1 * | 6/2013 | Lasko et al. | 707/726 |
| 8,577,913 B1 * | 11/2013 | Hansson et al. | 707/767 |
| 8,655,862 B1 | 2/2014 | Riley et al. | |
| 8,843,466 B1 * | 9/2014 | Zeiger et al. | 707/706 |
| 8,856,099 B1 * | 10/2014 | Lasko et al. | 707/706 |
| 8,868,590 B1 * | 10/2014 | Donneau-Golencer | 707/765 |
| 8,954,420 B1 * | 2/2015 | Khan | G06F 17/30867 707/722 |
| 8,972,391 B1 * | 3/2015 | McDonnell | G06F 17/3053 707/727 |
| 2002/0169764 A1 * | 11/2002 | Kincaid | G06F 17/30713 |
| 2003/0195877 A1 * | 10/2003 | Ford | G06F 17/30705 |
| 2006/0167896 A1 * | 7/2006 | Kapur | G06F 17/30867 |
| 2007/0050339 A1 * | 3/2007 | Kasperski | G06F 17/30967 |
| 2007/0050351 A1 * | 3/2007 | Kasperski | G06F 17/30864 |
| 2007/0192313 A1 * | 8/2007 | Finley | G06F 17/30991 |
| 2008/0016034 A1 * | 1/2008 | Guha | G06F 17/30864 |
| 2008/0091670 A1 * | 4/2008 | Ismalon | G06F 17/3064 |
| 2008/0140643 A1 * | 6/2008 | Ismalon | G06F 17/3053 |
| 2008/0256040 A1 * | 10/2008 | Sundaresan et al. | 707/3 |
| 2009/0119261 A1 * | 5/2009 | Ismalon | G06F 17/3064 |
| 2011/0035403 A1 * | 2/2011 | Ismalon | G06F 17/3064 707/769 |
| 2011/0161316 A1 * | 6/2011 | Jeh | G06F 17/30864 707/727 |
| 2011/0238662 A1 * | 9/2011 | Shuster | G06F 17/30554 707/728 |
| 2012/0096042 A1 * | 4/2012 | Brockett et al. | 707/798 |
| 2012/0158720 A1 * | 6/2012 | Luan | G06F 17/30867 707/732 |
| 2012/0265784 A1 * | 10/2012 | Hsu | G06F 17/3064 707/771 |
| 2012/0296927 A1 * | 11/2012 | Velipasaoglu et al. | 707/768 |
| 2013/0018900 A1 * | 1/2013 | Cheng et al. | 707/755 |
| 2014/0136323 A1 * | 5/2014 | Zhang et al. | 705/14.53 |

(Continued)

*Primary Examiner* — Farhan Syed
(74) *Attorney, Agent, or Firm* — Fish & Richardson P.C.

(57) ABSTRACT

Methods, systems, and apparatus, including computer programs encoded on computer storage media, for revising search queries. One of the methods includes receiving an original search query submitted by a user of a user device; determining that the original search query is similar to a first search query of a plurality of search queries previously submitted by the user; selecting a first term that appears in the first search query and not in the original search query, wherein selecting the first term comprises determining that the first term appears in at least a threshold number of other distinct search queries of the plurality of search queries previously submitted by the user; generating a revised search query by adding the first term that appears in the first search query to the original search query; and obtaining search results for the revised search query from a search engine.

27 Claims, 3 Drawing Sheets

(56) References Cited

U.S. PATENT DOCUMENTS

| | | | |
|---|---|---|---|
| 2014/0222404 A1* | 8/2014 | Shuster | 703/6 |
| 2014/0229461 A1* | 8/2014 | Cohen | G06F 17/30598 707/706 |
| 2014/0317097 A1* | 10/2014 | Elias et al. | 707/722 |
| 2014/0324527 A1* | 10/2014 | Kulkarni et al. | 705/7.29 |
| 2014/0379472 A1* | 12/2014 | Rao et al. | 705/14.53 |
| 2014/0379480 A1* | 12/2014 | Rao et al. | 705/14.58 |
| 2015/0032717 A1* | 1/2015 | Cramer | G06F 17/30867 707/709 |

* cited by examiner

REVISING SEARCH QUERIES

BACKGROUND

This specification relates to providing search results for search queries submitted to an Internet search engine.

Internet search engines aim to identify resources (e.g., web pages, images, text documents, multimedia content) that are relevant to a user's needs and to present information about the resources in a manner that is most useful to the user. Internet search engines return a set of search results in response to a user submitted query.

SUMMARY

In general, one innovative aspect of the subject matter described in this specification can be embodied in methods that include the actions of receiving an original search query submitted by a user of a user device to a search engine system; determining that the original search query is similar to a first search query of a plurality of search queries previously submitted by the user, wherein determining that the original search query is similar to the first search query comprises determining that at least one term from the original query matches a term that appears in the first search query; selecting a first term that appears in the first search query and not in the original search query, wherein selecting the first term comprises determining that the first term appears in at least a threshold number of other distinct search queries of the plurality of search queries previously submitted by the user, and wherein each other distinct search query is distinct from the both the first search query and the original search query; generating a revised search query by adding the first term that appears in the first search query to the original search query; and obtaining search results for the revised search query from a search engine.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. The method can further include providing the search results for the revised search query to the user device as part of a response to the original search query. The plurality of search queries previously submitted by the user can be search queries submitted by the user within a recent time window of submitting the original query. Determining that the original search query is similar to the first search query can further include: determining that, in response to the original search query, users have frequently selected search results that identify the same resources as search results that users have frequently selected in response to the first search query. Determining that the original search query is similar to the first search query further can include: determining that search results for the original search query overlap with search results for the first search query.

Generating the revised search query can include: adding an operator that identifies the first term as an optional term in the revised search query. The method can further include assigning a first weight to the first term in the revised search query, the first weight indicating that occurrences of the first term in a resource are given less weight than identical occurrences of terms from the original search query when generating a score for the resource in response to the revised search query. Two search queries can be submitted by the same user if identifiers of cookies received from respective user devices submitting the two search queries match or respective login identifiers of users submitting the two search queries match. The method can further include: counting appearances of the first term in the plurality of search queries, wherein counting appearances comprises counting appearances of the first term in search queries that do not include the at least one term from the original query that matches a term that appears in the first search query.

The subject matter described in this specification can be implemented in particular embodiments so as to realize one or more of the following advantages. More relevant search results can be provided to a user in response to a search query submitted by the user by revising the search query to include one or more terms from queries previously submitted by the user.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
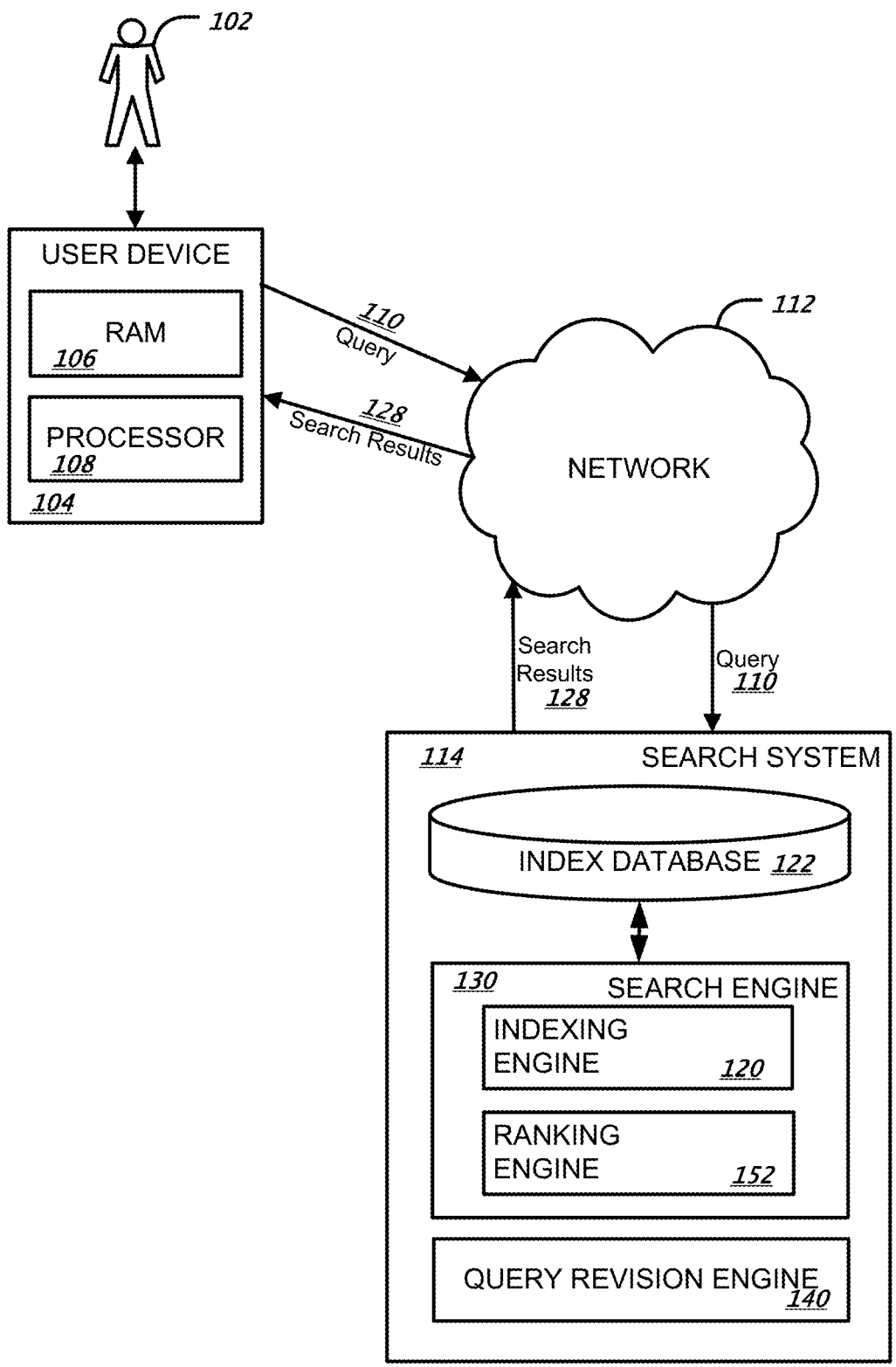
FIG. 1 shows an example search system.

FIG. 1 shows an example search system 114. The search system 114 is an example of an information retrieval system implemented as computer programs on one or more computers in one or more locations, in which the systems, components, and techniques described below can be implemented.

A user 102 can interact with the search system 114 through a user device 104. The user device 104 will generally include a memory, e.g., a random access memory (RAM) 106, for storing instructions and data and a processor 108 for executing stored instructions. The memory can include both read only and writable memory. For example, the user device 104 can be a computer coupled to the search system 114 through a data communication network 112, e.g., local area network (LAN) or wide area network (WAN), e.g., the Internet, or a combination of networks, any of which may include wireless links.

In some cases, the search system 114 can be implemented on the user device 104, for example, if a user installs an application that performs searches on the user device 104.

In some implementations, the search system 114 provides a user interface to the user device 104 through which the user 102 can interact with the search system 114. For example, the search system 114 can provide a user interface in the form of web pages that are rendered by a web browser running on the user device 104.

A user 102 can use the user device 104 to submit a query 110 to a search system 114. A search engine 130 within the search system 114 performs a search to identify resources matching the query. When the user 102 submits a query 110, the query 110 may be transmitted through the network 112 to the search system 114. The search system 114 includes an index database 122 and the search engine 130. The search system 114 responds to the query 110 by generating search results 128, which are transmitted through the network to the user device 104 for presentation to the user 102, e.g., as a search results web page to be displayed by a web browser running on the user device 104.

In this specification, the term "database" will be used broadly to refer to any collection of data: the data does not need to be structured in any particular way, or structured at all, and it can be stored on storage devices in one or more locations. Thus, for example, the index database 122 can include multiple collections of data, each of which may be organized and accessed differently. Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

When the query 110 is received by the search engine 130, the search engine 130 identifies resources that satisfy the query 110. The search engine 130 will generally include an indexing engine 120 that indexes resources, an index database 122 that stores the index information, and a ranking engine 152 or other software that generates scores for the resources that satisfy the query 110 and that ranks the resources according to their respective scores.

The search system 114 also includes or can communicate with a query revision engine 140 that revises search queries received from users before they are processed by the search engine 130. Once the query revision engine 140 provides a revised query, the search engine 130 can identify resources that satisfy the revised query. The query revision engine 140 can revise a received search query by adding to the received search query one or more terms from a search query that had previously been submitted to the search system 114.

Figure 2:
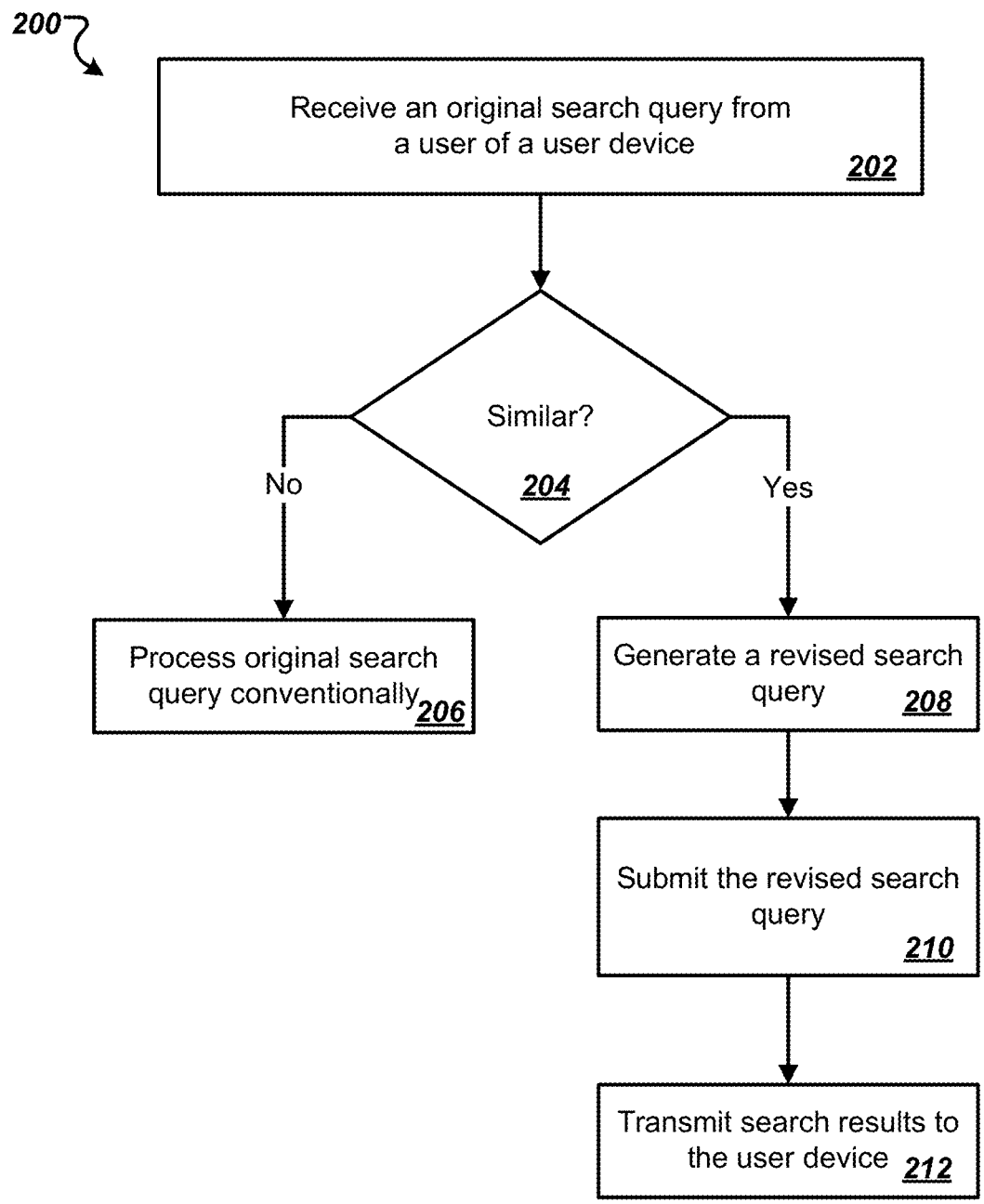
FIG. 2 is a flow diagram of an example process for revising a search query to include one or more terms from a previously submitted query.

FIG. 2 is a flow diagram of an example process 200 for revising a search query to include one or more terms from a previously submitted query. For convenience, the process 200 will be described as being performed by a system of one or more computers located in one or more locations. For example, a search system, e.g., search system 114 of FIG. 1, can be used to perform the process 200.

The system receives an original search query from a user of a user device (step 202). The original search query is one or more terms submitted by the user to the system, e.g., through a user interface provided by the system to the user device.

The system determines whether the original search query is similar to one or more previously submitted search queries (step 204). The set of previously submitted search queries considered as potentially being similar to the original search query are search queries that have previously been submitted to the search system by the same user that submitted the original search query. For example, the set of previously submitted queries may include a pre-determined number of queries previously submitted the user, each query submitted by the user within a recent time window, or each query previously submitted by the user that is recorded in data available to the system. The system can determine whether two search queries were submitted by the same user, e.g., based on a comparison of identifiers of cookies received from the user devices submitting the two search queries or on a comparison of respective login identifiers of users submitting the two queries. An example process for determining whether two search queries submitted by a user are similar is described below with reference to FIG. 3.

If the original search query is not similar to any query in the set of previously submitted queries, the system determines not to revise the received search query and processes the original search query conventionally (step 206). In processing the search query conventionally, the system may revise the query to include other kinds of terms, e.g., synonyms or other word forms of terms in the original search query.

If the original search query is similar to a previously submitted query, the system generates a revised search query by adding one or more terms from the previously submitted queries to the original search query (step 208). The system selects the terms to be added to the original search query from terms included in the previously submitted similar queries. For example, the system may add each term that appears in a previously submitted similar query and in at least a threshold number of other queries in the set of previously submitted queries that are distinct from one another. Two queries can be considered to be distinct from one another if they differ by at least one term that is not a pre-determined stop word. For example, the system may add each term that appears in a previously submitted query that is similar to the original query and in at least two, three, or four other queries previously submitted by the user. In determining which terms from previously submitted queries to add to the original search query, the system can disregard pre-determined stop words. That is, even if a stop word satisfies the other criteria for being added to the original query, the system can determine not to add the stop word to the query.

Instead of or in addition to adding one or more terms from a previously submitted query to the original search query, the system can optionally generate the revised query by removing one or more terms from the original query. For example, the system can determine whether removing any terms from the original query yields a revised query that has search results that overlap with search results for the original query. The system can determine that two queries have search results that overlap if, e.g., a count of search results for one query that identify a resource that is also identified by a search result for the other query exceeds a predetermined threshold value. In determining whether search results for two queries overlap, the system may optionally consider only a threshold number of highest-ranked search results for each query.

If removing a particular term results in a revised search query that has search results that overlap with the search results for the original search query, the system can determine whether the revised search query is more popular than the original search query. One search query can be considered more popular than another search query if it has been submitted to a search engine more frequently than the other search query. If the revised search query is more popular than the original search query, the system can determine to remove the particular term from the original search query.

The system submits the revised query to a search engine to obtain search results for the revised query (step 210). As described above, as part of generating search results for a search query, the search engine generates scores for the resources that satisfy the query. The score generated by the search engine for each resource can be based in part on how many times terms from the search query occur in the resource. Different occurrences of a term may be of varying significance in determining the score for a resource, e.g., an occurrence of a term in the title of the resource can be more significant than another occurrence of the same term in a different portion of the resource.

In some implementations, each term in a query is assigned a weight, with the weight for a given term indicating how significant occurrences of the term in a resource are in determining the score for the resource relative to occurrences of other terms in the query. In these implementations, the system can assign a respective weight to each term in the revised search query, with the respective weights for each of the added terms from previously submitted queries being lower than the respective weights of terms from the original query. When that is done, occurrences of the added terms in a resource would be less significant than identical occurrences of terms from the original query in generating the score for the resource.

In addition to or instead of assigning lower weights to the added terms, the system can include an operator in the revised search query that identifies the added terms as optional terms. An optional term is a term whose presence in a resource is not mandatory for the resource to satisfy the search query.

The system transmits the obtained search results to the user device for presentation to the user as part of a response to the original search query (step 212).

Figure 3:
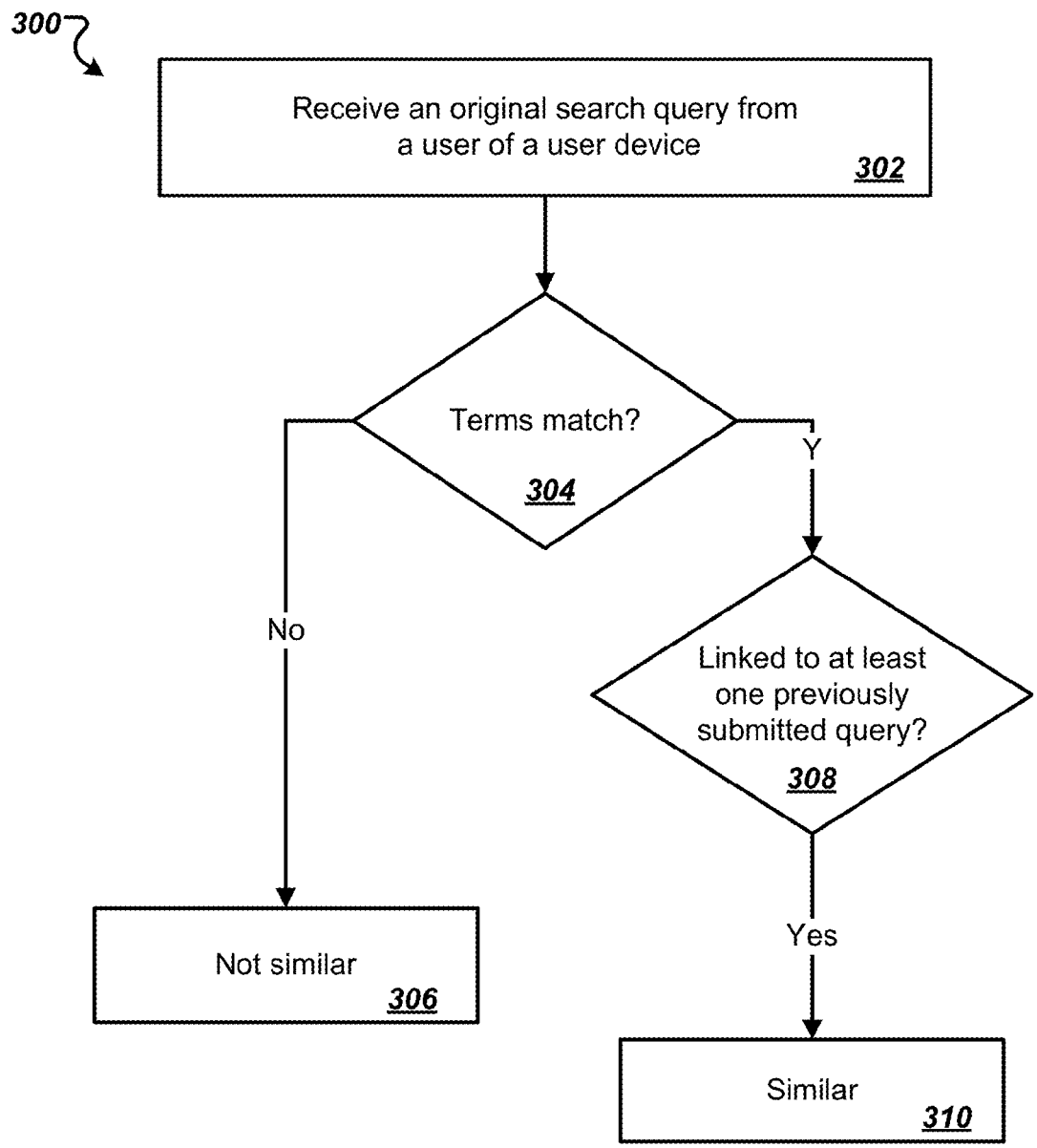
FIG. 3 is a flow diagram of an example process for determining whether a search query is similar to a previously submitted query.

FIG. 3 is a flow diagram of an example process 300 for determining whether a search query is similar to a previously submitted query. For convenience, the process 300 will be described as being performed by a system of one or more computers located in one or more locations. For example, a search system, e.g., search system 114 of FIG. 1, can be used to perform the process 300.

The system receives an original search query from a user of a user device (step 302).

The system determines whether any of the terms in the original search query match a term from a query in the set of previously submitted queries (step 304). In determining whether any terms match, the system can disregard particular pre-determined stop words.

If no terms from the original search query match a term from a previously submitted query, the system determines that the search query is not similar to any previously submitted query (step 306).

If at least one term from the original search query matches a term from at least one previously submitted query, the system determines whether the original search query is linked to at least one of the previously submitted queries that have a matching term (step 308). The system can determine whether two search queries are linked by accessing data that identifies related search queries for each of a group of search queries. The related search queries are identified based on user selections of search results provided to the users in response to search queries. A selection of a search result can be, e.g., a user action made with respect to the search result that initiates a request for the resource identified by the search result. For example, the user action with respect to the search result may be a "click" on the search result, a voice-based selection, or a selection by a user's finger on a presence-sensitive input mechanism, e.g., a touch-screen device, or any other appropriate selection mechanism. In some implementations, selection data may not be tethered to the identity of individual users.

For example, the related queries for a particular search query can be queries in response to which users have frequently selected search results that identify the same resources as search results that users have frequently selected in response to the original search query.

If the data indicates that one of the previously submitted search queries that have a matching term is a related search query for the original search query, the system determines that the two search queries are linked. In some implementations, the system also determines that the original search query is linked to a previously submitted search query if the data identifies the same search query as being related to each of the two search queries.

If the original search query is not linked to any of the previously submitted queries that have a matching term, the system determines that the original search query is not similar to any previously submitted query (step 306).

If the original search query is linked to at least one of the previously submitted queries having a matching term, the system determines that the original search query is similar to the previously submitted query (step 310).

In some implementations, the system also compares search results for the original search query and the previously submitted search query. If the search results for the original search query and the previously submitted search query overlap, the system can determine that the two queries are similar. If the search results do not overlap, the system can determine that the two queries are not similar. The system can determine whether the search results overlap, e.g., as described above with reference to FIG. 2.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
    receiving a current search query submitted by a current user of a current user device to a search engine system;
    determining that the current search query is similar to a first previously submitted search query of a plurality of previously submitted search queries that have previously been submitted by the current user to the search engine system, wherein determining that the current search query is similar to the first previously submitted search query comprises determining that at least one first term from the current search query matches a corresponding term that appears in the first previously submitted search query;
    determining that a different second term satisfies the condition that:
        (i) the different second term appears in the first previously submitted search query that is similar to the current search query,
        (ii) the different second term does not appear in the current search query, and
        (iii) the different second term appears in at least a threshold number of other distinct search queries of the plurality of previously submitted search queries that have previously been submitted by the current user, wherein each other distinct search query is distinct from both the first previously submitted search query and the current search query;
    generating a revised search query by adding the different second term to the current search query;
    obtaining search results for the revised search query from a search engine; and
    providing the search results to the current user in a response to the current search query.

2. The method of claim 1, wherein providing the search results to the current user in a response to the current search query comprises:
    providing the search results for the revised search query to the current user device as part of the response to the current search query.

3. The method of claim 1, wherein the plurality of previously submitted search queries are search queries submitted by the current user within a recent time window of submitting the current query.

4. The method of claim 1, wherein determining that the current search query is similar to the first previously submitted search query further comprises:
    determining that, in response to the current search query, users have frequently selected search results that identify the same resources as search results that users have frequently selected in response to the first previously submitted search query.

5. The method of claim 1, wherein determining that the current search query is similar to the first previously submitted search query further comprises:
    determining that search results for the current search query overlap with search results for the first previously submitted search query.

6. The method of claim 1, wherein generating the revised search query comprises:
    adding an operator that identifies the different second term as an optional term in the revised search query.

7. The method of claim 1, further comprising:
    assigning a first weight to the different second term in the revised search query, the first weight indicating that occurrences of the different second term in a resource are given less weight than identical occurrences of terms from the current search query when generating a score for the resource in response to the revised search query.

8. The method of claim 1, wherein a previous search query is included in the plurality of previously submitted search queries if an identifier of a respective cookie received from a respective user device submitting the previous search query matches an identifier of a respective cookie received from the current user device or a respective login identifier of a respective user submitting the previous search query matches a login identifier of the current user.

9. The method of claim 1, further comprising:
    counting appearances of the different second term in the plurality of previously submitted search queries, wherein counting appearances comprises counting appearances of the different second term in search queries that do not include the at least one first term from the current query that matches the corresponding term that appears in the first previously submitted search query.

10. A system comprising one or more computers and one or more storage devices storing instructions that, when executed by the one or more computers, cause the one or more computers to perform operations comprising:
    receiving a current search query submitted by a current user of a current user device to a search engine system;
    determining that the current search query is similar to a first previously submitted search query of a plurality of previously submitted search queries that have previously been submitted by the current user to the search engine system, wherein determining that the current search query is similar to the first previously submitted search query comprises determining that at least one first term from the current search query matches a corresponding term that appears in the first previously submitted search query;
    determining that a different second term satisfies the condition that:
        (i) the different second term appears in the first previously submitted search query that is similar to the current search query,
        (ii) the different second term does not appear in the current search query, and
        (iii) the different second term appears in at least a threshold number of other distinct search queries of the plurality of previously submitted search queries that have previously been submitted by the current user, wherein each other distinct search query is distinct from both the first previously submitted search query and the current search query;
    generating a revised search query by adding the different second term to the current search query;
    obtaining search results for the revised search query from a search engine; and
    providing the search results to the current user in a response to the current search query.

11. The system of claim 10, wherein providing the search results to the current user in a response to the current search query comprises:
    providing the search results for the revised search query to the current user device as part of the response to the current search query.

12. The system of claim 10, wherein the plurality of previously submitted search queries are search queries submitted by the current user within a recent time window of submitting the current query.

13. The system of claim 10, wherein determining that the current search query is similar to the first previously submitted search query further comprises:
 determining that, in response to the current search query, users have frequently selected search results that identify the same resources as search results that users have frequently selected in response to the first previously submitted search query.

14. The system of claim 10, wherein determining that the current search query is similar to the first previously submitted search query further comprises:
 determining that search results for the current search query overlap with search results for the first previously submitted search query.

15. The system of claim 10, wherein generating the revised search query comprises:
 adding an operator that identifies the different second term as an optional term in the revised search query.

16. The system of claim 10, the operations further comprising:
 assigning a first weight to the different second term in the revised search query, the first weight indicating that occurrences of the different second term in a resource are given less weight than identical occurrences of terms from the current search query when generating a score for the resource in response to the revised search query.

17. The system of claim 10, wherein a previous search query is included in the plurality of previously submitted search queries if an identifier of a respective cookie received from a respective user device submitting the previous search query matches an identifier of a respective cookie received from the current user device or a respective login identifier of a respective user submitting the previous search query matches a login identifier of the current user.

18. The system of claim 10, the operations further comprising:
 counting appearances of the different second term in the plurality of previously submitted search queries, wherein counting appearances comprises counting appearances of the different second term in search queries that do not include the at least one first term from the current query that matches the corresponding term that appears in the first previously submitted search query.

19. A computer storage medium encoded with a computer program, the program comprising instructions that when executed by one or more computers cause the one or more computers to perform operations comprising
 receiving a current search query submitted by a current user of a current user device to a search engine system;
 determining that the current search query is similar to a first previously submitted search query of a plurality of previously submitted search queries that have previously been submitted by the current user to the search engine system, wherein determining that the current search query is similar to the first previously submitted search query comprises determining that at least one first term from the current search query matches a corresponding term that appears in the first previously submitted search query;
 determining that a different second term satisfies the condition that:
  (i) the different second term appears in the first previously submitted search query that is similar to the current search query,
  (ii) the different second term does not appear in the current search query, and
  (iii) the different second term appears in at least a threshold number of other distinct search queries of the plurality of previously submitted search queries that have previously been submitted by the current user, wherein each other distinct search query is distinct from both the first previously submitted search query and the current search query;
 generating a revised search query by adding the different second term to the current search query;
 obtaining search results for the revised search query from a search engine; and
 providing the search results to the current user in a response to the current search query.

20. The computer storage medium of claim 19, wherein providing the search results to the current user in a response to the current search query comprises:
 providing the search results for the revised search query to the current user device as part of the response to the current search query.

21. The computer storage medium of claim 19, wherein the plurality of previously submitted search queries are search queries submitted by the current user within a recent time window of submitting the current query.

22. The computer storage medium of claim 19, wherein determining that the current search query is similar to the first previously submitted search query further comprises:
 determining that, in response to the current search query, users have frequently selected search results that identify the same resources as search results that users have frequently selected in response to the first previously submitted search query.

23. The computer storage medium of claim 19, wherein determining that the current search query is similar to the first previously submitted search query further comprises:
 determining that search results for the current search query overlap with search results for the first previously submitted search query.

24. The computer storage medium of claim 19, wherein generating the revised search query comprises:
 adding an operator that identifies the different second term as an optional term in the revised search query.

25. The computer storage medium of claim 19, the operations further comprising:
 assigning a first weight to the different second term in the revised search query, the first weight indicating that occurrences of the different second term in a resource are given less weight than identical occurrences of terms from the current search query when generating a score for the resource in response to the revised search query.

26. The computer storage medium of claim 19, wherein a previous search query is included in the plurality of previously submitted search queries if an identifier of a respective cookie received from a respective user device submitting the previous search query matches an identifier of a respective cookie received from the current user device or a respective login identifier of a respective user submitting the previous search query matches a login identifier of the current user.

27. The computer storage medium of claim 19, the operations further comprising:
 counting appearances of the different second term in the plurality of previously submitted search queries, wherein counting appearances comprises counting appearances of the different second term in search queries that do not include the at least one first term from the current query that matches the corresponding term that appears in the first previously submitted search query.

* * * * *